United States Patent
Hart et al.

(10) Patent No.: US 7,757,953 B2
(45) Date of Patent: Jul. 20, 2010

(54) SECURE MAGNETIC STRIPE READER

(75) Inventors: Annmarie D. Hart, Marblehead, MA (US); Terrence R. Benson, Redondo Beach, CA (US); Lawrence R. Meyers, Rancho Palos Verdes, CA (US)

(73) Assignee: MagTek, Inc., Seal Beach, CA (US)

( * ) Notice: Subject to any disclaimer, the term of this patent is extended or adjusted under 35 U.S.C. 154(b) by 349 days.

(21) Appl. No.: 11/623,670

(22) Filed: Jan. 16, 2007

(65) Prior Publication Data

US 2008/0017712 A1 Jan. 24, 2008

Related U.S. Application Data (60) Provisional application No. 60/758,673, filed on Jan. 13, 2006.

(51) Int. Cl.
G06K 7/08 (2006.01)
(52) U.S. Cl. ..................... 235/449; 235/379; 235/380
(58) Field of Classification Search ............. 235/379, 235/380, 383, 449, 493; 705/72
See application file for complete search history.

(56) References Cited

U.S. PATENT DOCUMENTS

| 5,235,166 | A |   | 8/1993  | Fernandez |
|-----------|---|---|---------|-----------|
| 5,365,586 | A | * | 11/1994 | Indeck et al. ............... 713/176 |
| 5,430,279 | A |   | 7/1995  | Fernandez |
| 5,524,072 | A | * | 6/1996  | Labaton et al. ............... 705/72 |
| 5,616,904 | A |   | 4/1997  | Fernandez |
| 5,644,636 | A |   | 7/1997  | Fernandez |
| 5,768,389 | A | * | 6/1998  | Ishii ........................... 380/30 |
| 5,920,628 | A | * | 7/1999  | Indeck et al. ................. 360/25 |
| 6,760,841 | B1 |  | 7/2004  | Fernandez |
| 6,830,182 | B2 |  | 12/2004 | Izuyama |
| 2006/0049255 | A1 | * | 3/2006 | von Mueller et al. ........ 235/449 |

\* cited by examiner

*Primary Examiner*—Karl D. Frech
(74) *Attorney, Agent, or Firm*—Christie, Parker & Hale, LLP

(57) ABSTRACT

Magnetic stripe readers that are configured to extract information from magnetic media and encrypt part of the extracted information are provided. Embodiments of magnetic stripe readers include measures to resist tampering and inputs to receive unencrypted information from input devices. One embodiment includes a housing containing a magnetic reading head connected to a decoder circuit that is connected to an encryption engine. The magnetic reading head generates a signal indicative of a magnetic field. The decoder circuit is configured to extract data from the output of the magnetic reading head and the encryption engine is configured to encrypt a portion of the extracted data and the encryption engine is configured to pass a portion of the extracted data unencrypted.

28 Claims, 7 Drawing Sheets

SECURE MAGNETIC STRIPE READER

CROSS REFERENCE TO RELATED APPLICATIONS

The present application claims the benefit of Provisional Application No. 60/758,673, filed Jan. 13, 2006, entitled "SECURE MAGNETIC STRIPE READER", the content of which is expressly incorporated herein by reference in its entirety.

BACKGROUND TO THE INVENTION

The present invention relates generally to magnetic stripe card readers and more specifically to magnetic stripe card readers that encrypt information extracted from a magnetic stripe.

Documents bearing magnetic stripes, such as magnetic stripe cards, are commonly used in a variety of transactions. In many instances data read from the magnetic stripe can be provided to a server to verify that the document bearing the magnetic stripe is authentic.

A number of different approaches are known for authenticating a document bearing a magnetic stripe. One approach is to extract data stored on the magnetic stripe and verify the authenticity of the data. Another approach that can foil attempts to reproduce information recorded on a magnetic stripe is to extract data concerning the physical characteristics of the magnetic stripe itself. Observations of the materials used to construct magnetic stripes have revealed that each material is unique and generates magnetic field with unique characteristics that are observable. When a signal is generated that is indicative of the magnetic field, the component of the signal that is indicative of this unique characteristic is often referred to as the remanent noise signal of the material. A number of authentication processes compare information concerning the remanent noise signal of a magnetic stripe on the document presented with known information concerning the remanent noise characteristic of the magnetic stripe of the authentic document. Correlation between the information suggests that the document presented is in fact authentic. Processes that seek to extract information that is unique to a particular magnetic stripe or data recording on a magnetic stripe are commonly referred to as 'Magnetic Fingerprinting' techniques.

SUMMARY OF THE INVENTION

Embodiments of magnetic stripe readers and methods of authenticating documents bearing magnetic mediums are disclosed. In addition, use of a magnetic stripe reader to encrypt information from an input device such as a keyboard is disclosed. One embodiment of the invention includes a housing containing a magnetic reading head connected to a decoder circuit that is connected to an encryption engine. The magnetic reading head generates a signal indicative of a magnetic field. The decoder circuit is configured to extract data from the output of the magnetic reading head including information indicative of unique characteristics of the magnetic stripe and the encryption engine is configured to encrypt a portion of the data extracted from the magnetic stripe and the encryption engine is configured to pass a portion of the extracted data unencrypted.

In a further embodiment the encryption engine stores at least one encryption key and the housing is configured to detect tampering. In addition, the encryption engine is configured to delete at least one encryption key in response to the detection of tampering by the housing and the housing includes a security enclosure.

In another embodiment, the magnetic stripe card includes an account number recorded on the magnetic stripe, the portion of encrypted data includes a portion of the account number and a portion of the unencrypted data includes a portion of the account number.

In a further embodiment again, the decoder circuit is configured to extract information indicative of unique characteristics of the magnetic stripe, the portion of encrypted information includes the extracted information indicative of unique characteristics of the magnetic stripe and the unique characteristic includes samples of the remanent noise characteristics of the magnetic stripe.

In a still further embodiment, a memory containing a serial number and the encryption engine is further configured to encrypt at least part of the serial number.

Still another embodiment also includes a communication interface and the communication interface is configured to provide the encrypted data and the unencrypted data to external devices.

In a yet further embodiment, an input configured to receive information from an input device, an input configured to receive instructions from an external device and an output configured to transmit information to the external device. In addition, the encryption engine is configured to encrypt at least a portion of the information received from the input device and provide the encrypted information and at least a portion of any unencrypted information to the external device.

Yet another embodiment includes a magnetic stripe reader configured to extract information from the magnetic stripe of a magnetic stripe card and encrypt a portion of the extracted information, wherein the extracted information includes information inherent to the magnetic stripe that uniquely identifies the magnetic stripe, a terminal configured to receive the encrypted information and the unencrypted information and a server connected to the terminal via a network. In addition, the server is configured to authenticate the magnetic stripe using at least a portion of the encrypted information provided to the terminal by the magnetic stripe reader and at least a portion of the unencrypted information provided to the terminal by the magnetic stripe reader.

In a still further embodiment again, the magnetic stripe reader includes an encryption engine containing at least one encryption key and the server is configured to decrypt information encrypted using the encryption key, the magnetic stripe reader includes a housing including tamper detection sensors and the magnetic stripe reader is configured to erase at least one encryption key in response to the detection of tampering by the tamper detection sensors.

In still another embodiment again, the magnetic stripe reader includes a serial number, the magnetic stripe reader is configured to provide the encrypted serial number to the server and the server is configured to authenticate the magnetic stripe reader using the serial number.

In a yet further embodiment again, the extracted information includes information inherent to the magnetic stripe that uniquely identifies the magnetic stripe and the information inherent to the magnetic stripe is information indicative of the remanent noise of the magnetic stripe.

Yet another embodiment again also includes an input device connected to the magnetic stripe reader and the magnetic stripe reader is configured to encrypt at least a portion of the input received from the input device.

An embodiment of the method of the invention includes extracting information stored in the magnetic medium, wherein the extracted information includes information inherent to the magnetic stripe that uniquely identifies the magnetic stripe, encrypting some of the extracted information, transmitting the encrypted information and at least some of the unencrypted information and receiving information concerning the authenticity of the document.

A further embodiment of the method of the invention also includes displaying at least some of the unencrypted data and determining whether an instruction is received terminating the process.

In another embodiment of the method of the invention the extracted information includes information concerning a unique characteristic inherent to the magnetic medium and the extracted information includes information indicative of the remanent noise characteristic of at least a portion of the magnetic stripe.

In a still further embodiment of the method of the invention, storing at least one encryption key, detecting attempts to discover the encryption key and deleting the encryption key in response to the detection of an attempt to discover the encryption key.

Still another embodiment of the method of the invention also includes storing a serial number, transmitting the encrypted serial number with the encrypted and unencrypted information and authenticating the serial number.

A yet further embodiment of the method of the invention also includes receiving input from an input device, transmitting information indicative of the input received from the input device, receiving an instruction to encrypt the information received from the input device and transmitting information indicative of the encrypted information. In addition, the information received from the input device is used in the authentication of the document bearing the magnetic medium.

Another further embodiment of the method of the invention includes receiving encrypted and unencrypted information extracted from a magnetic stripe card, decrypting the encrypted information and combining the decrypted information with the unencrypted information, comparing at least a portion of the combined information with at least one record of stored information and transmitting an indication of the authenticity of the information, wherein at least one record of stored information includes information concerning a remanent noise characteristic of a magnetic medium.

In another further embodiment of the method of the invention again, at least one record of stored information includes information concerning a remanent noise characteristic of a magnetic medium and the comparison involves determining the correlation between the information concerning the remanent noise characteristic of a magnetic medium and at least a portion of the received encrypted and unencrypted information.

In still another further embodiment of the method of the invention, the combined information includes an account number that is used to identify at least one record.

In yet another further embodiment of the invention, the encrypted information includes a portion indicative of information provided by a user via an input device, at least one record includes master information and the comparison includes matching the user provided information with the master information.

Another still further embodiment of the method of the invention includes extracting information from the magnetic stripe of the magnetic stripe card, encrypting at least a portion of the extracted information, transmitting the encrypted information, and transmitting at least a portion of the extracted information unencrypted.

DETAILED DESCRIPTION OF THE INVENTION

Turning now to the drawings, embodiments of the present invention that include a magnetic stripe reader that is connected to a terminal are shown. The magnetic stripe reader extracts information from magnetic stripes on documents, encrypts some of the extracted information and provides at least some of the unencrypted information and some of the encrypted information to the terminal. In one aspect of the invention, the terminal can display some unencrypted information so that a terminal operator can identify any discrepancies between information on the document that is visually apparent and information contained on the magnetic stripe of the document. In another aspect of the invention, the terminal provides the unencrypted and the encrypted information received from the magnetic stripe reader to a host system or server. In many embodiments, the data terminal provides the information to the server via a network. In a number of embodiments, the reader is constructed with a tamper resistant housing and can identify itself with an encrypted and/or unencrypted serial number. Several embodiments also include USB ports to enable the connection of the reader between a keyboard and a computer. Embodiments that are interposed between a keyboard and a computer can enable the selective encryption of the output of the keyboard. By encrypting the output, an unsecured keyboard can provide encrypted PINs to the computing device for use in financial transactions.

Figure 1:
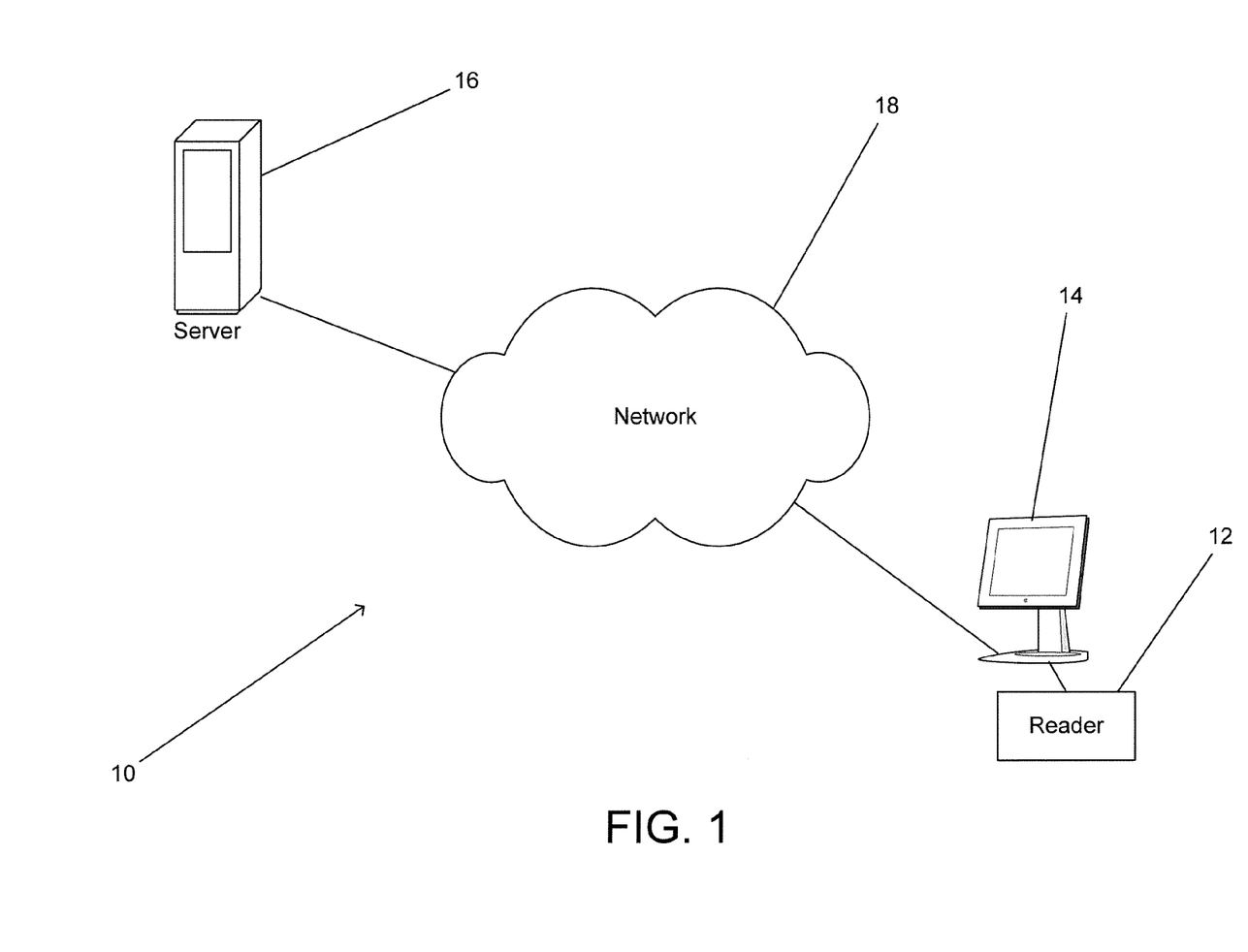
FIG. 1 schematic diagram of a transaction system in accordance with an embodiment of the present invention.

A network in accordance with an embodiment of the present invention is shown in FIG. 1. The network 10 includes a magnetic stripe card reader 12 that is connected to a terminal 14. The terminal is connected to a server 16 via a network 18.

In many embodiments, the magnetic stripe card reader 12 is configured to read magnetic stripes on documents such as credit cards. When a credit card is presented to the magnetic stripe card reader that complies with ISO Standard 7810/7811, the magnetic stripe card reader 12 can extract information from tracks 1, 2 and/or 3 of the magnetic stripe card. Tracks 1, 2 and 3 commonly include information such as an account number, the name of the account holder and the expiration date of the card. In addition to extracting recorded data, the magnetic stripe card reader can also extract a magnetic fingerprint of the magnetic stripe. In many embodiments, techniques such as those described in U.S. Pat. No. 6,098,881 to Deland, Jr., et al. and U.S. patent application Ser. Nos. 11/014,930, 11/014,931 and 11/015,271, now U.S. Pat. Nos. 7,478,751, 7,210,627, 7,377,433, respectively, which are hereby incorporated by reference in their entirety, can be used to extract a magnetic fingerprint of a magnetic stripe.

Once the magnetic stripe card reader 12 has extracted information from a magnetic stripe, the magnetic stripe card reader is configured to encrypt a portion of the extracted data. In many embodiments, the extracted data includes an account number, name and expiration date, which the magnetic stripe card reader can partially encrypt. In a number of embodiments, a sufficient portion of the extracted data is left unencrypted so that a comparison can be performed between the unencrypted information and information displayed visually on the document. In addition to information extracted from the magnetic stripe card, the magnetic stripe card reader 12 can also encrypt at least a portion of information (such as a serial number) that uniquely identifies the magnetic stripe card reader and/or the magnetic reading head used to capture the information. The serial number can then be used to authenticate the reader to the server independently of the process used for authentication of a data card.

The magnetic stripe card reader 12 is also configured to provide the unencrypted and encrypted information to a terminal. As discussed above, the unencrypted information can be compared to information that is visually apparent on the document. Typically, a terminal will include a display device and the unencrypted information can be displayed on the display device so that a terminal operator can perform a comparison between the unencrypted information and information visually apparent on the card. In many embodiments, the unencrypted information is displayed in conjunction with meaningless characters (such as 'X') that denote a character that has been encrypted and, therefore, is not available for display by the terminal. In the event that the information does not correspond, then the terminal operator can cancel the transaction. In the absence of an interruption by a terminal operator, both the unencrypted and encrypted information are provided to the server 16 via the network 18. In addition to transmitting the unencrypted and encrypted information provided by the magnetic stripe card reader 12, the terminal can also transmit information that uniquely identifies the terminal. The terminal identification information can be encrypted or unencrypted.

In many embodiments, the server 16 includes a database of information concerning valid documents bearing magnetic stripes. In order to ascertain whether the information received from a terminal is associated with a valid document, the server 18 can decrypt the encrypted information and combine the decrypted information with the unencrypted information transmitted by the terminal. The combined information can then be compared against the records maintained in the database and a determination made concerning the authenticity of the document from which the information was extracted. The determination with respect to authenticity is transmitted to the terminal via the network and the determination used by the terminal in deciding whether to proceed with the transaction.

In many embodiments, a public key/private key encryption scheme is used by the magnetic stripe card reader 12. In a number of embodiments, each magnetic stripe card reader possesses a unique encryption key and in several embodiments, the server can change the encryption key. In a number of embodiments an encryption scheme complying with a standard commonly used by the financial industry such as Triple Data Encryption Standard (Triple DES) developed by International Business Machines Corporation of Armonk, N.Y. can be used. Many such embodiments derive a different encryption key for each transaction (commonly referred to by the acronym 'DUKPT', which stands for Derived Unique Key Per Transaction and is specified as ANSI X9.24). In other embodiments, other encryption techniques can be used.

Figure 2:
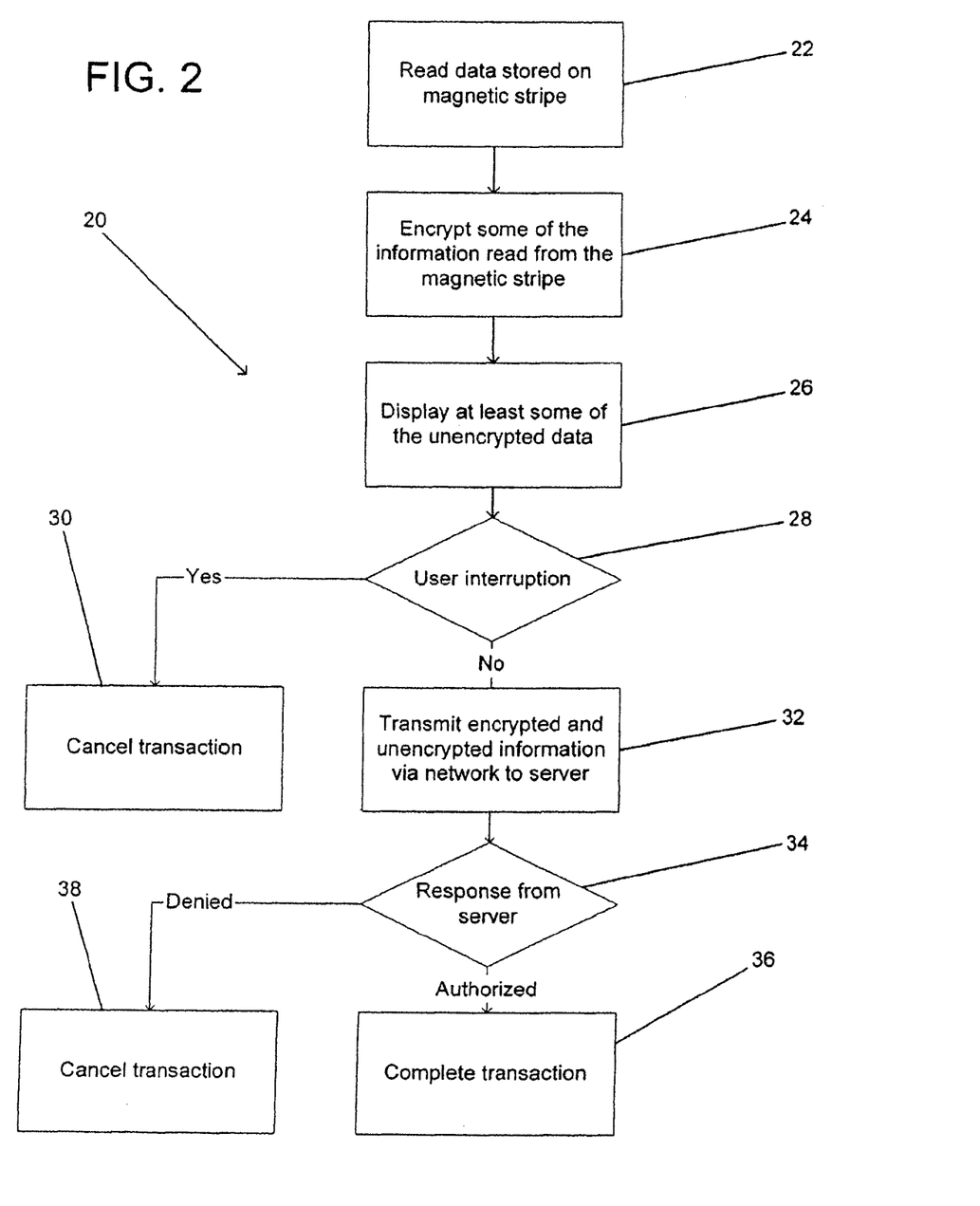
FIG. 2 is a flow chart showing a process in accordance with an embodiment of the present invention that can be performed by a terminal and a magnetic stripe card reader.

A process in accordance with the present invention that can be performed by a magnetic stripe card reader and terminal is shown in FIG. 2. The process 20 includes reading (22) data from the magnetic tracks of a magnetic stripe located on a document. Some of the data is then encrypted (24) and then at least some of the unencrypted data is displayed (26). In the event that a user interruption occurs (28), then the transaction is cancelled (30). Otherwise, at least some of the unencrypted data and at least some of the encrypted data are transmitted (32) to a server. A response is received (34) from the server. If the server's response indicates that the document bearing the magnetic stripe is authentic, then the transaction is processed (36). Otherwise, the transaction is cancelled (38). In several embodiments, methods are used that include several of the operations shown in FIG. 2 and/or perform the operations in different sequences.

Figure 3:
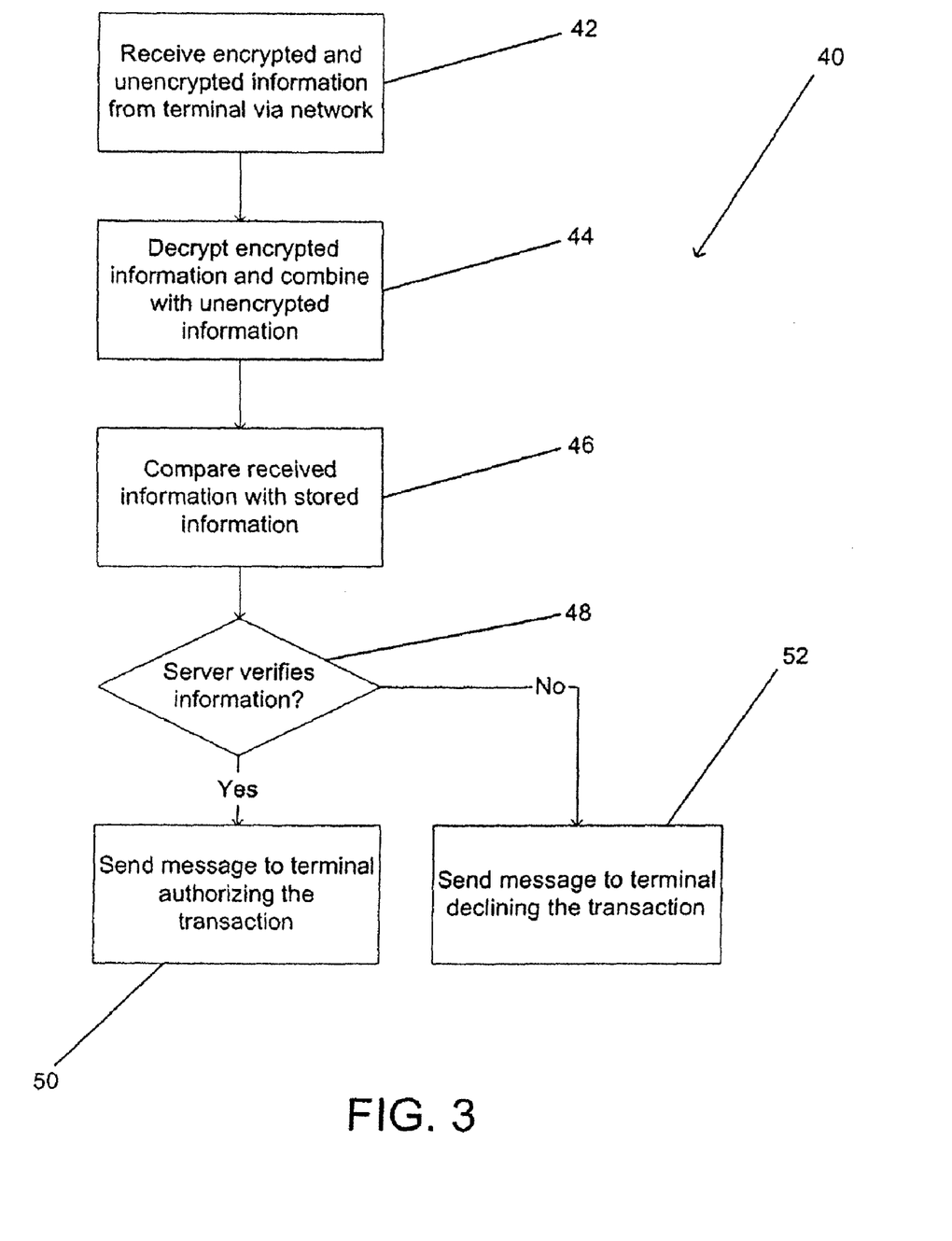
FIG. 3 is a flow chart showing a process in accordance with an embodiment of the present invention that can be performed by a server.

A process in accordance with the present invention that can be performed by a server is shown in FIG. 3. The process 40 commences when unencrypted and encrypted information is received (42) from a terminal. The encrypted information is decrypted (44) and then combined with the unencrypted information. The combined decrypted and unencrypted information is then compared (46) against stored information. A determination is then made (48) concerning whether the stored information verifies the authenticity of the document bearing the magnetic stripe from which the decrypted and unencrypted information was obtained. If the authenticity of the document is verified, then a message can be sent (50) to the terminal indicating that the document is authentic. Otherwise, a message can be sent (52) to the terminal indicating that the attempt to authenticate the document was unsuccessful. In several embodiments, methods are used that include several of the operations shown in FIG. 3 and/or perform the operations in different sequences.

Figure 4:
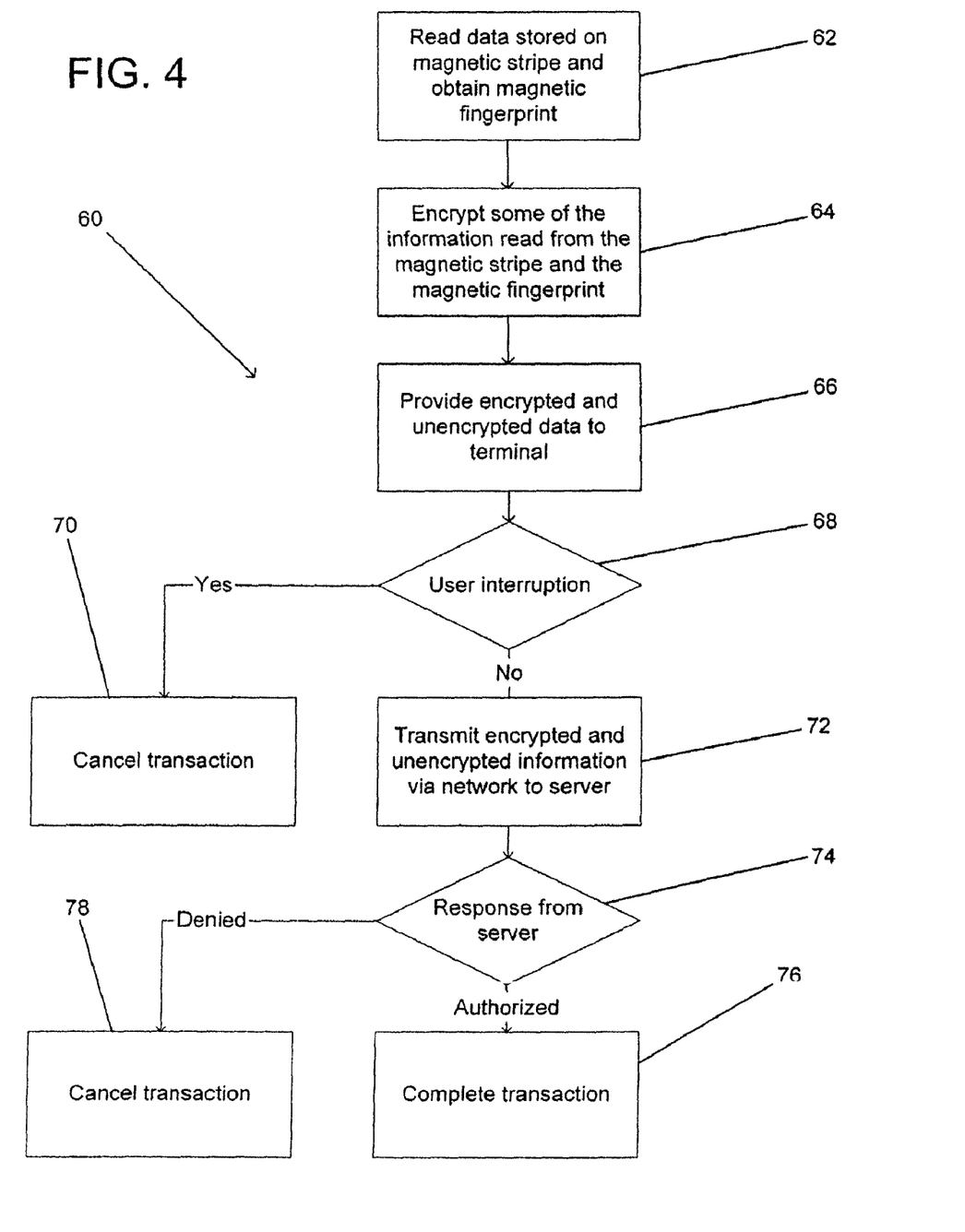
FIG. 4 is a flow chart showing a process in accordance with another embodiment of the present invention that can be performed by a terminal and a magnetic stripe card reader.

A process that can be implemented by a magnetic stripe card reader and a terminal for verifying the authenticity of a document bearing a magnetic stripe is shown in FIG. 4. The process 60 is similar to the process 20 shown in FIG. 2 with the addition that a magnetic fingerprint is extracted (62) from the magnetic stripe in addition to data. The magnetic fingerprint is also at least partially encrypted (64) and is provided (66) to the terminal for transmission (72) with the unencrypted and encrypted data extracted from the magnetic stripe that is sent to the server.

Figure 5:
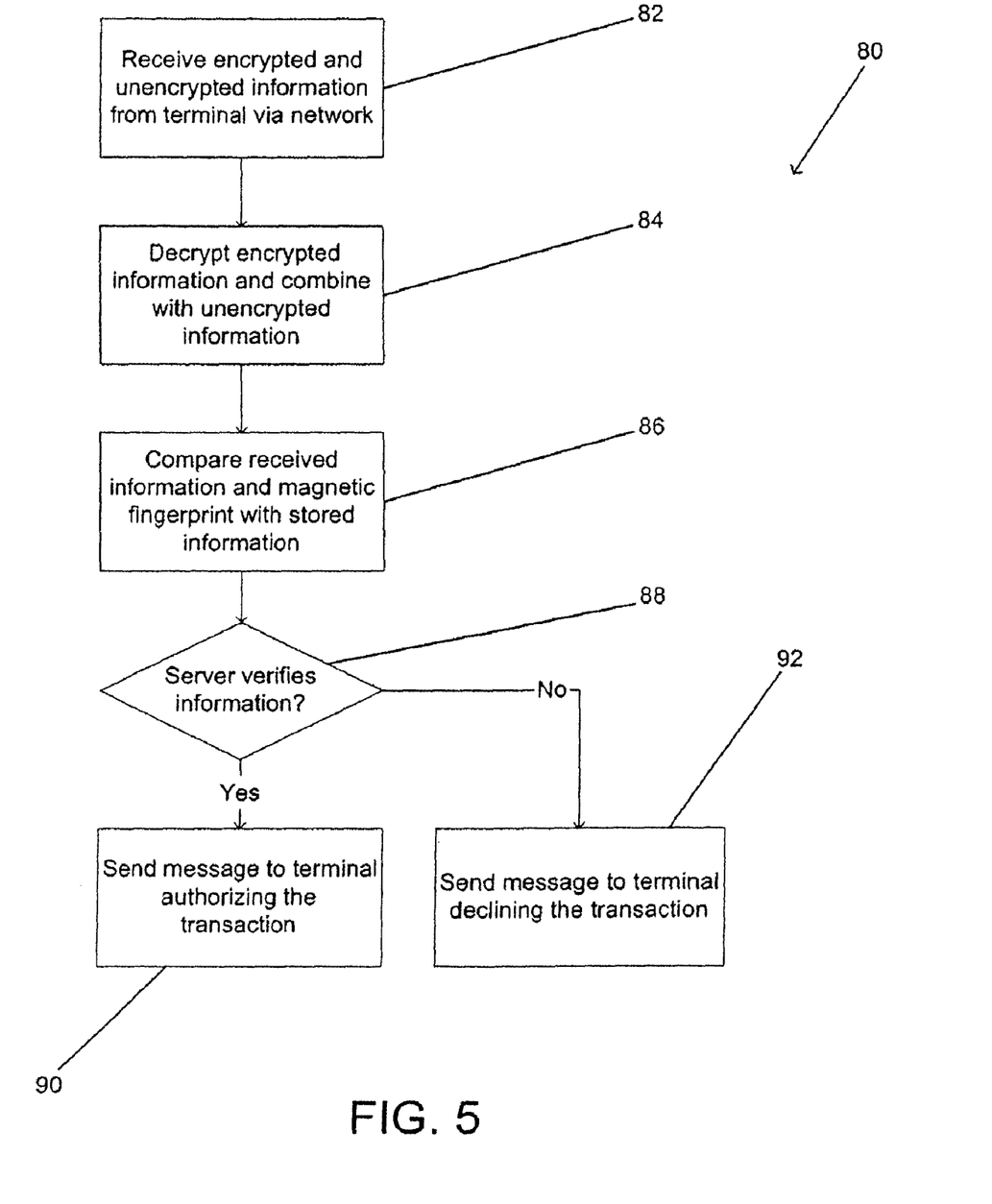
FIG. 5 is a flow chart showing a process in accordance with another embodiment of the present invention that can be performed by a server.

A process that can be implemented by a server in accordance with the present invention for determining the authenticity of a document based upon unencrypted and encrypted information extracted from a magnetic stripe on the document is shown in FIG. 5. The process 80 is similar to the process 40 shown in FIG. 3 with the addition that comparison of the unencrypted and decrypted information with the stored information involves determining the correspondence between an extracted magnetic fingerprint and at least one copy of the magnetic fingerprint that is maintained at a server. A variety of techniques are known for comparing magnetic fingerprints to determine authenticity including those described in U.S. Pat. No. 6,098,881 to Deland, Jr., et al. and U.S. patent application Ser. Nos. 11/014,930, 11/014,931 and 11/015,271, now U.S. Pat. Nos. 7,478,751, 7,210,627, 7,377,433, respectively, which are incorporated above.

Figure 6:
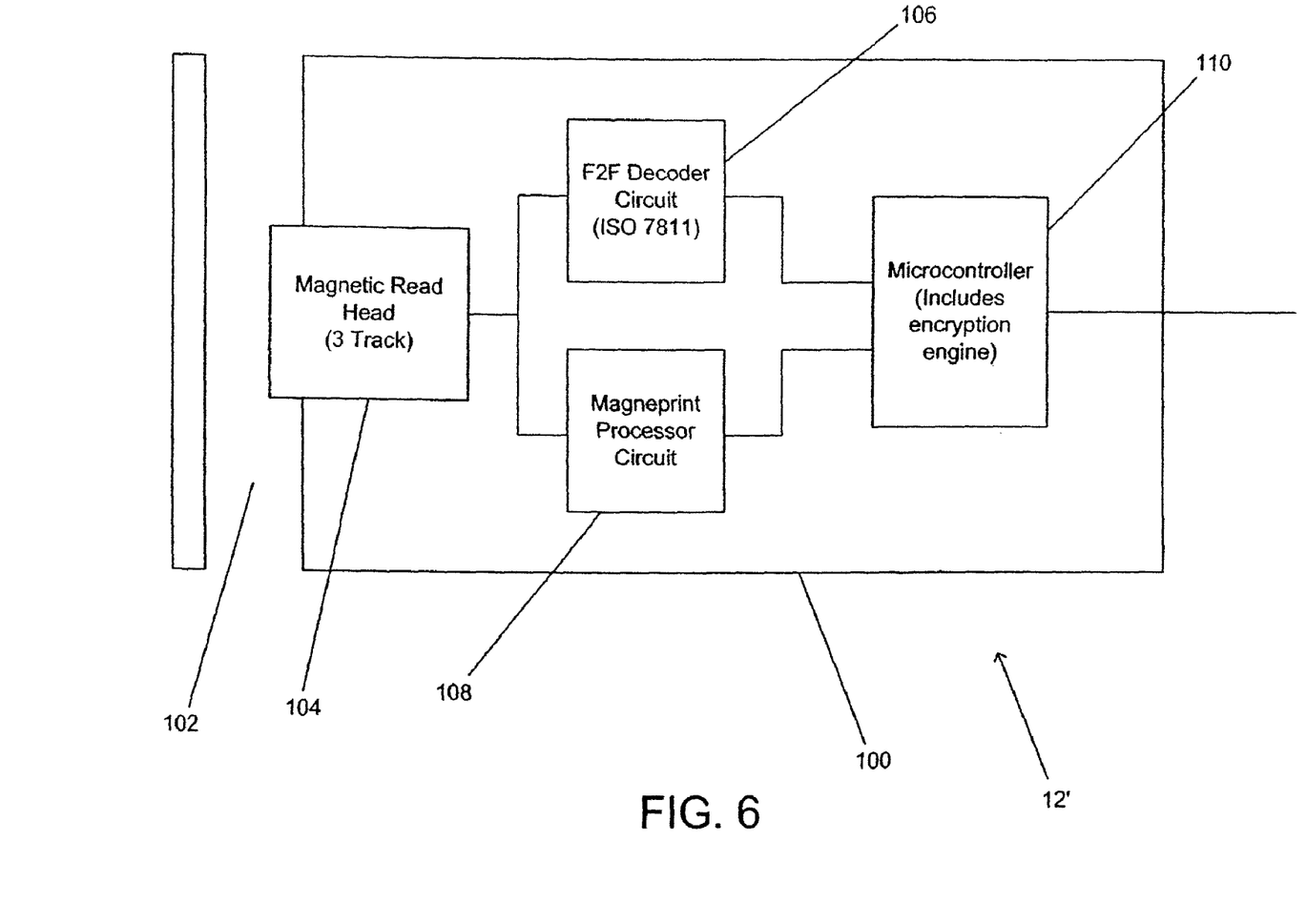
FIG. 6 is a schematic diagram of a magnetic stripe reader in accordance with an embodiment of the present invention.

An embodiment of a magnetic stripe reader in accordance with the present invention is shown in FIG. 6. The reader 12' includes a housing 100 in which a card path 102 is located. In the illustrated embodiment the card path is that of a swipe reader. In other embodiments, insertion readers, motorized card readers and other types of reader configurations can be used. A magnetic reading head 104 is located within the card path. In the illustrated embodiment, the magnetic reading head 104 is configured to read information recorded as three tracks on the magnetic stripe of a card complying with the ISO 7811 standard. The output of the magnetic reading head is provided to both a decoder circuit 106 and a circuit 108 configured to extract a magnetic fingerprint from the output signal. The decoder circuit 106 extracts digital data recorded as tracks on the magnetic stripe. The circuit 108 derives specific information from the output signal of the magnetic reading head that constitutes the magnetic fingerprint of the magnetic stripe. The data extracted by the decoder circuit 106 and the magnetic fingerprint extracted by the circuit 108 are provided to a microcontroller. The microcontroller can include an encryption engine that selectively encrypts portions of the data and magnetic fingerprint received by the microcontroller. As discussed above, the microcontroller can implement one of any number of encryption standards. Once the selected information is encrypted, then the unencrypted and encrypted information along with additional information such as a serial number for the reader (encrypted or unencrypted) can be forwarded to a terminal in the manner described above.

In addition to the embodiment shown in FIG. 6, many different configurations of circuits and circuit components can be combined to obtain a signal indicative of the magnetic field of a magnetic stripe and to extract data signals and information that can be used to uniquely identify the magnetic stripe from which the signal was obtained. In addition, many different varieties of circuits and components can be used to encrypt the information and format the unencrypted and encrypted information for provision to a terminal. Once the information is received by the terminal, the information can be reformatted and additional information appended by the terminal prior to transmission to a server via a network. As indicated above, the server can be configured in any variety of ways including possessing the circuitry necessary to coordinate the encryption scheme used by the network.

In the embodiment shown in FIG. 6, the components of the magnetic stripe reader are contained within a housing. In a number of embodiments, the housing is constructed in a way that is tamper resistant. In many embodiments, the magnetic reader is constructed so that an attempt to tamper with the reader will result in the erasure of some or all of the information contained within the encryption engine of the microcontroller. In many embodiments, information is erased and the microcontroller enters a tamper mode. In the tamper mode, the microcontroller can only perform functions associated with diagnosing the attempt to tamper with the magnetic stripe reader. In numerous embodiments, attempts to detect tampering with the reader are detected using a security enclosure. Examples of security enclosures include a matrix of conductive ink traces, such as the Tamper Respondent Surface Enclosure manufactured by W. L. Gore and Associates of Elkton, Md. In several embodiments, the security enclosure can detect heat, electricity or other forms of tampering.

In the discussion above, the authentication of information provided by a document bearing a magnetic stripe is discussed. In a number of embodiments, the information on a document can be supplemented with information entered via a keyboard or other input device. If the input device is not secured, then the input from the input device can be intercepted. Magnetic card readers in accordance with several embodiments of the invention attempt to frustrate efforts to intercept data entered by input devices that provide unencrypted outputs. The unencrypted input devices are connected to the magnetic card readers and the card readers are connected to the terminal (such as a personal computer). The magnetic card reader passes through information, unless the terminal and/or the input device indicate that the information is intended to remain secure. In the event that the information is intended to remain secure, the information is encrypted by the magnetic card reader before transmission to the terminal. By physically disconnecting the input device from the terminal, the magnetic card reader creates a hardware firewall between the input device and the terminal.

Figure 7:
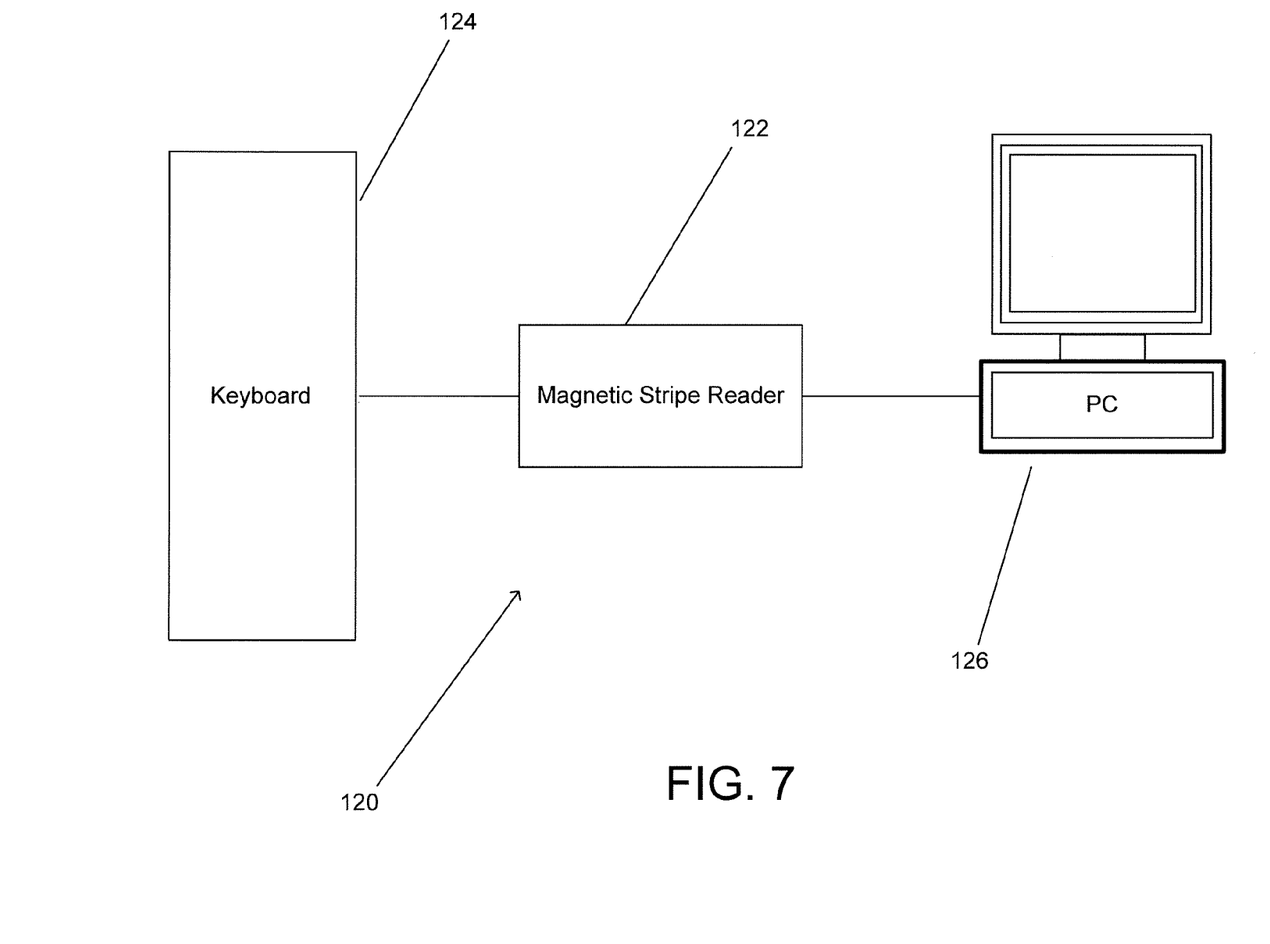
FIG. 7 is a schematic diagram of a magnetic stripe reader connected between a keyboard and a computer in accordance with an embodiment of the invention.

An embodiment 120 of a magnetic card reader connected between a keyboard and a personal computer in accordance with an embodiment of the invention is shown in FIG. 7. The magnetic card reader 122 is connected via a USB connection to a keyboard 124 and via a USB connection to the personal computer. In the illustrated embodiment, the magnetic card reader 122 can act to interrupt the physical connection between the keyboard and the personal computer.

Although a keyboard is illustrated, any of a variety of devices that produce an unencrypted output can be combined with an appropriately configured magnetic stripe reader in accordance with the present invention. Moreover, the magnetic stripe reader can be connected between an input device and any of a variety of terminals. Although USB connections are illustrated, any appropriate communication protocols can be used to connect the input device to the terminal. In a number of embodiments, the protocols are the same as the magnetic stripe reader is interposed between the input device and the terminal. In other embodiments, the system is designed to include the magnetic stripe reader and different protocols can be used for the communications between the input device and the magnetic stripe reader and the communications between the magnetic stripe reader and the terminal.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A magnetic stripe reader configured to extract data from a magnetic stripe card having a magnetic stripe, comprising:
    a housing containing a magnetic reading head connected to a decoder circuit that is connected to an encryption engine;
    wherein the magnetic reading head generates a signal indicative of a magnetic field;
    wherein the decoder circuit is configured to extract data from the output of the magnetic reading head including information indicative of unique characteristics of the magnetic stripe;
    wherein the encryption engine is configured to encrypt a portion of the data extracted from the magnetic stripe and the encryption engine is configured to pass a portion of the extracted data unencrypted.

2. The magnetic stripe reader of claim 1, wherein:
    the encryption engine stores at least one encryption key; and
    the housing is configured to detect tampering;

wherein the encryption engine is configured to delete at least one encryption key in response to the detection of tampering by the housing.

3. The magnetic stripe reader of claim 2, wherein the housing includes a security enclosure.

4. The magnetic stripe reader of claim 1, wherein:
the magnetic stripe card includes an account number recorded on the magnetic stripe;
the portion of encrypted data includes a portion of the account number; and
a portion of the unencrypted data includes a portion of the account number.

5. The magnetic stripe reader of claim 1, wherein the portion of encrypted information includes the extracted information indicative of unique characteristics of the magnetic stripe.

6. The magnetic stripe reader of claim 5, wherein the unique characteristic includes samples of the remanent noise characteristics of the magnetic stripe.

7. The magnetic stripe reader of claim 1, further comprising:
a memory containing a serial number;
wherein the encryption engine is further configured to encrypt at least part of the serial number.

8. The magnetic stripe reader of claim 1, further comprising:
a communication interface;
wherein the communication interface is configured to provide the encrypted data and the unencrypted data to external devices.

9. The magnetic stripe reader of claim 1, further comprising:
an input configured to receive information from an input device;
an input configured to receive instructions from an external device; and
an output configured to transmit information to the external device;
wherein the encryption engine is configured to encrypt at least a portion of the information received from the input device and provide the encrypted information and at least a portion of any unencrypted information to the external device.

10. A system, comprising:
a magnetic stripe reader configured to extract information from the magnetic stripe of a magnetic stripe card and encrypt a portion of the extracted information, wherein the extracted information includes information inherent to the magnetic stripe that uniquely identifies the magnetic stripe;
a terminal configured to receive the encrypted information and the unencrypted information;
a server connected to the terminal via a network;
wherein the server is configured to authenticate the magnetic stripe using at least a portion of the encrypted information provided to the terminal by the magnetic stripe reader and at least a portion of the unencrypted information provided to the terminal by the magnetic stripe reader.

11. The system of claim 10, wherein:
the magnetic stripe reader includes an encryption engine containing at least one encryption key; and
the server is configured to decrypt information encrypted using the encryption key.

12. The system of claim 11, wherein:
the magnetic stripe reader includes a housing including tamper detection sensors; and
the magnetic stripe reader is configured to erase at least one encryption key in response to the detection of tampering by the tamper detection sensors.

13. The system of claim 11, wherein:
the magnetic stripe reader includes a serial number;
the magnetic stripe reader is configured to provide the encrypted serial number to the server;
the server is configured to authenticate the magnetic stripe reader using the serial number.

14. The system of claim 10, wherein the information inherent to the magnetic stripe is information indicative of the remanent noise of the magnetic stripe.

15. The system of claim 10, further comprising:
an input device connected to the magnetic stripe reader;
wherein the magnetic stripe reader is configured to encrypt at least a portion of the input received from the input device.

16. A method of authenticating a document bearing a magnetic medium, comprising:
extracting information stored in the magnetic medium, wherein the extracted information includes information concerning a unique characteristic inherent to the magnetic medium;
encrypting some of the extracted information;
transmitting the encrypted information and at least some of the unencrypted information; and
receiving information concerning the authenticity of the document.

17. The method of claim 16, comprising:
displaying at least some of the unencrypted data; and
determining whether an instruction is received terminating the process.

18. The method of claim 16, wherein the extracted information includes information indicative of the remanent noise characteristic of at least a portion of the magnetic stripe.

19. The method of claim 16, further comprising:
storing at least one encryption key;
detecting attempts to discover the encryption key; and
deleting the encryption key in response to the detection of an attempt to discover the encryption key.

20. The method of claim 16, further comprising:
storing a serial number;
transmitting the encrypted serial number with the encrypted and unencrypted information; and
authenticating the serial number.

21. The method of claim 16, further comprising:
receiving input from an input device;
transmitting information indicative of the input received from the input device.

22. The method of claim 21, further comprising:
receiving an instruction to encrypt the information received from the input device; and
transmitting information indicative of the encrypted information.

23. The method of claim 22, wherein the information received from the input device is used in the authentication of the document bearing the magnetic medium.

24. A method of authenticating information using at least one record of stored information, comprising:
receiving encrypted and unencrypted information extracted from a magnetic stripe card;

decrypting the encrypted information and combining the decrypted information with the unencrypted information;

comparing at least a portion of the combined information with the at least one record of stored information; and transmitting an indication of the authenticity of the information;

wherein at least one record of stored information includes information concerning a remanent noise characteristic of a magnetic medium.

25. The method of claim 24, wherein the comparison involves determining the correlation between the information concerning the remanent noise characteristic of a magnetic medium and at least a portion of the received encrypted and unencrypted information.

26. The method of claim 24, wherein the combined information includes an account number that is used to identify at least one record.

27. The method of claim 24, wherein:

the encrypted information includes a portion indicative of information provided by a user via an input device;

at least one record includes master information; and the comparison includes matching the user provided information with the master information.

28. A method for providing data from a magnetic stripe card having a magnetic stripe, comprising:

extracting information from the magnetic stripe of the magnetic stripe card;

encrypting at least a portion of the extracted information;

transmitting the encrypted information; and transmitting at least a portion of the extracted information unencrypted.

* * * * *